United States Patent
Cheng et al.

(10) Patent No.: US 8,983,644 B2
(45) Date of Patent: Mar. 17, 2015

(54) MANUFACTURING EXECUTION SYSTEM WITH VIRTUAL-METROLOGY CAPABILITIES AND MANUFACTURING SYSTEM INCLUDING THE SAME

(75) Inventors: Fan-Tien Cheng, Tainan (TW); Chi-An Kao, Tainan (TW); Hsien-Cheng Huang, Taoyuan County (TW); Yung-Cheng Chang, Tainan County (TW)

(73) Assignee: National Cheng Kung University, Tainan (TW)

( * ) Notice: Subject to any disclaimer, the term of this patent is extended or adjusted under 35 U.S.C. 154(b) by 596 days.

(21) Appl. No.: 12/784,428

(22) Filed: May 20, 2010

(65) Prior Publication Data

US 2011/0251707 A1 Oct. 13, 2011

(30) Foreign Application Priority Data

Apr. 13, 2010 (TW) .................. 99111473 A (51) Int. Cl.
*G06F 19/00* (2011.01)
*G06E 1/00* (2006.01)
(Continued)

(52) U.S. Cl.
CPC *G05B 19/41875* (2013.01); *G05B 2219/31459* (2013.01); *G05B 2219/32191* (2013.01); *G05B 2219/35346* (2013.01); *G05B 2219/45031* (2013.01)
USPC ........... 700/108; 700/100; 700/110; 700/121; 700/96; 700/109; 706/15; 706/16; 706/10

(58) Field of Classification Search
CPC ............... G05B 2219/45031; G05B 19/41875; H01L 21/67276; H01L 22/20
USPC .................. 700/108, 100, 110, 121, 96, 109; 706/15, 16, 10
See application file for complete search history.

(56) References Cited

U.S. PATENT DOCUMENTS 6,263,255 B1 * 7/2001 Tan et al. .................. 700/121
6,834,375 B1 * 12/2004 Stine et al. ................ 716/56
(Continued)

FOREIGN PATENT DOCUMENTS

| CN | 101258499 A | 9/2008 |
|---|---|---|
| CN | 101581930 A | 11/2009 |

(Continued)

OTHER PUBLICATIONS

Khan et al., An Approach for Factory-Wide Control Utilizing Virtual Metrology, Nov. 2007, IEEE transactions on Semiconductor Manufacturing, vol. 20, No. 4, pp. 364-375.*

(Continued)

*Primary Examiner* — Kenneth Lo
*Assistant Examiner* — Jason Lin
(74) *Attorney, Agent, or Firm* — CKC & Partners Co., Ltd.

(57) ABSTRACT

A manufacturing execution system (MES) with virtual-metrology capabilities and a manufacturing system including the MES are provided. The MES is built on a middleware architecture (such as an object request broker architecture), and includes an equipment manager, a virtual metrology system (VMS), a statistical process control (SPC) system, an alarm manager and a scheduler. The manufacturing system includes a first process tool, a second process tool, a metrology tool, the aforementioned MES, a first R2R (Run-to-Run) controller and a second R2R controller.

17 Claims, 5 Drawing Sheets

(51) Int. Cl.
*G06F 3/00* (2006.01)
*G06F 15/18* (2006.01)
*G05B 19/418* (2006.01)

(56) References Cited

U.S. PATENT DOCUMENTS

| | | | | |
|---|---|---|---|---|
| 7,324,193 | B2 * | 1/2008 | Lally et al. | 356/237.2 |
| 7,328,418 | B2 * | 2/2008 | Yamashita et al. | 700/121 |
| 7,477,960 | B2 * | 1/2009 | Willis et al. | 700/121 |
| 7,502,659 | B2 * | 3/2009 | Beffa | 700/121 |
| 7,603,328 | B2 | 10/2009 | Cheng et al. | |
| 8,527,080 | B2 * | 9/2013 | Assaf et al. | 700/101 |
| 2005/0237926 | A1 * | 10/2005 | Cheng et al. | 370/216 |
| 2007/0012337 | A1 * | 1/2007 | Hillman et al. | 134/1.3 |
| 2007/0232045 | A1 * | 10/2007 | Lally et al. | 438/597 |
| 2008/0275586 | A1 * | 11/2008 | Ko et al. | 700/110 |
| 2008/0281456 | A1 * | 11/2008 | Chen et al. | 700/113 |
| 2008/0306625 | A1 * | 12/2008 | Cheng et al. | 700/145 |
| 2009/0118851 | A1 * | 5/2009 | Behm et al. | 700/96 |
| 2009/0228129 | A1 * | 9/2009 | Moyne et al. | 700/102 |
| 2009/0292386 | A1 | 11/2009 | Cheng et al. | |

FOREIGN PATENT DOCUMENTS

| | | |
|---|---|---|
| TW | 200745974 | 12/2007 |
| TW | I302645 B | 11/2008 |
| TW | 200949596 A | 12/2009 |
| TW | 200951652 A | 12/2009 |

OTHER PUBLICATIONS

Huang et al., Automatic Virtual Metrology System Design and Implementation, Aug. 23-26, 2008, 4th IEEE Conference on Automation Science and Engineering, pp. 223-229.*

An approach for factory-wide control utilizing virtual metrology.

* cited by examiner

MANUFACTURING EXECUTION SYSTEM WITH VIRTUAL-METROLOGY CAPABILITIES AND MANUFACTURING SYSTEM INCLUDING THE SAME

RELATED APPLICATIONS

This application claims priority to Taiwan Application Serial Number 99111473, filed Apr. 13, 2010, which is herein incorporated by reference.

BACKGROUND

1. Field of Invention

The present invention relates to a manufacturing execution system (MES) and a manufacturing system. More particularly, the present invention relates to a MES and a manufacturing system with virtual-metrology capabilities.

2. Description of Related Art

A MES is application software for assisting an enterprise to actively collect and monitor production data generated during fabrication procedures since receiving orders, production in process, process control until product completion, thereby assuring the production quality of a product or workpiece, wherein the workpiece is referred to as a wafer in the semiconductor industry and as a glass substrate in the TFT-LCD industry. In the MES, a statistical process control (SPC) system is a main tool for monitoring and maintaining workpiece quality. The objective of the SPC system is to effectively monitor the performance of a process over time so as to verify if the process is at a "state of statistical control".

Semiconductor manufacturing has very complicated production flow, long processing time and high production cost. To fabricate a 65 nm workpiece, it needs more than 36 material layers, more than 500 processing steps and longer than 50 days for a production cycle time. The average cost for fabricating a 300 mm wafer with 65 nm technology is more than 3000 US dollars. Hence, semiconductor manufacturing heavily relies on the SPC system for quality monitoring.

Figure 1:
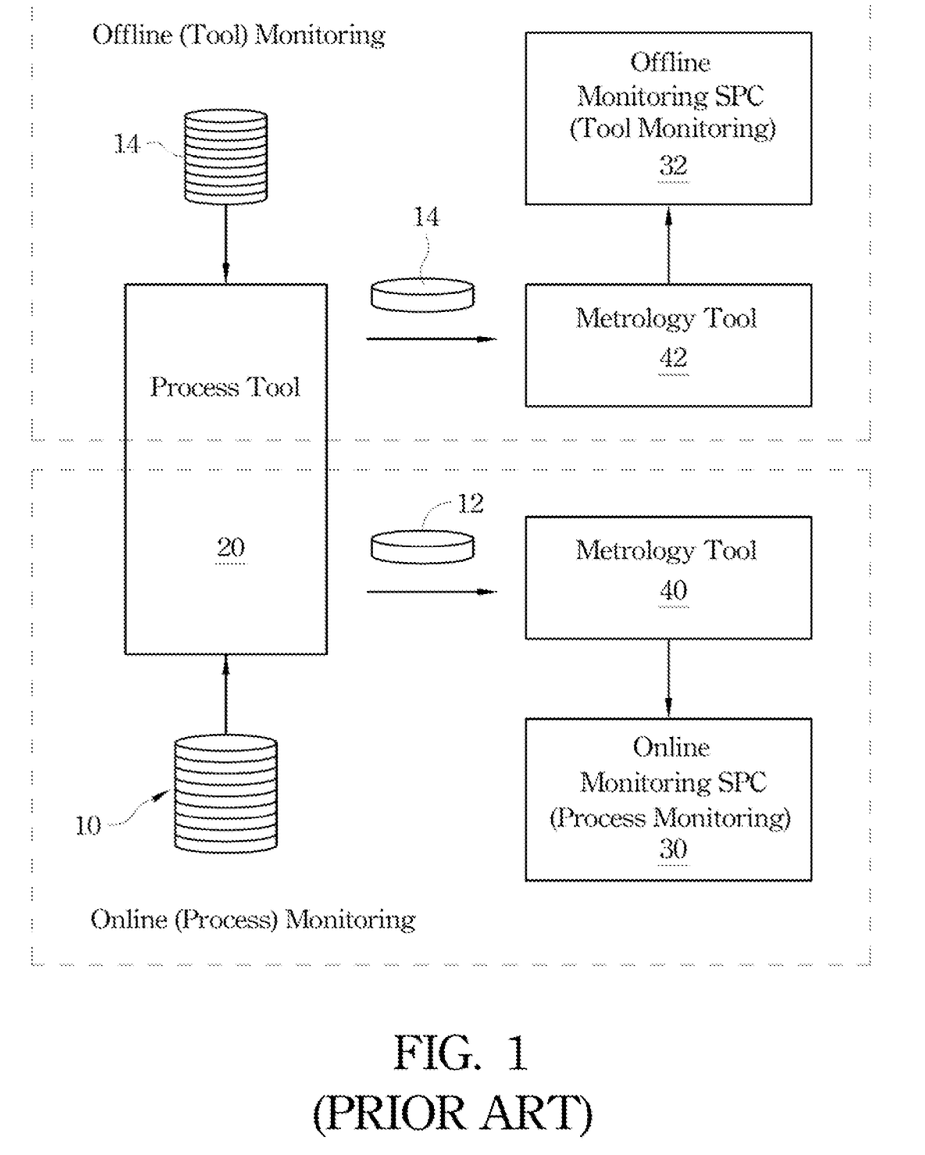
FIG. 1 is a schematic diagram showing tool-monitoring and process-monitoring scenarios of applying a conventional SPC system on semiconductor manufacturing.

Referring to FIG. 1, FIG. 1 is a schematic diagram showing tool-monitoring and process-monitoring scenarios of applying a conventional SPC system on semiconductor manufacturing. In the semiconductor manufacturing, the conventional SPC system can be divided into an online monitoring SPC (process monitoring) 30 and an offline monitoring SPC (tool monitoring) 32. When the online monitoring SPC 30 is in operation, several workpieces 10 (such as 25 wafers) in production are first placed on a process tool 20 for treatment, wherein the workpieces belong to one identical cassette or front opening unified pod (FOUP). After the process tool 20 has finished processing the workpieces 10, the workpieces 10 are put back to the cassette and transferred to a metrology tool 40 for inspecting the quality of the workpieces. Generally speaking, the metrology tool 40 may select a sample workpiece (wafer) 12 from the workpieces 10 with a fixed order in the entire cassette for measurement, such as the first wafer in the cassette. Then, the online monitoring SPC 30 performs online process monitoring based on the measurement result of the sample workpiece 12.

When the offline monitoring SPC 32 is in operation, a test workpiece (wafer) 14 used for testing is first placed in the process tool 20 for treatment. After the process tool 20 has finished processing the test workpiece 14, the test workpiece 14 is transferred to a metrology tool 42 for measurement. Thereafter, the offline monitoring SPC 32 performs offline tool monitoring based on the measurement result of the test workpiece 14.

However, the online monitoring SPC 30 can only inspect the sample workpiece 12 selected from the workpieces 10 as a representation of all of the workpieces, but cannot perform workpiece-to-workpiece (W2W) total inspection on all of the workpieces, and also cannot perform process monitoring until the measurement of the sample workpiece is done, thus failing to perform real-time monitoring. The offline monitoring SPC 32 needs to use quite a few test workpieces 14 for performing tool monitoring, which not only increases production cost but also occupies precious production time of the process tool 20, and in addition, the test workpieces 14 cannot accurately represent the quality of the workpieces 10 in production.

Hence, it is desirable to provide a MES and a manufacturing system for overcoming the aforementioned shortcomings of the conventional systems.

SUMMARY

One aspect of the present invention is to provide a MES with virtual-metrology capabilities for performing W2W total inspection by integrating a virtual metrology system (VMS) into the conventional MES.

Another aspect of the present invention is to provide a manufacturing system with virtual-metrology capabilities for performing W2W control by providing the virtual metrology values of all of the workpieces to run-to-run (R2R) controllers via the VMS.

According to the aforementioned aspects, a MES with virtual-metrology capabilities is provided. In one embodiment, the MES with virtual-metrology capabilities includes an equipment manager, a VMS, a SPC system, an alarm manager and a scheduler. The equipment manager is used for transmitting a plurality of sets of process data sent from a process tool, wherein the sets of process data are used for respectively processing a plurality of workpieces in a cassette. The VMS is used for computing a first virtual metrology value of each of the workpieces based on the sets of process data. The SPC system is used for inspecting each of the workpieces according to the first virtual metrology value of each of the workpieces and detecting if there is at least one abnormality alarm occurring. The alarm manager is used for receiving and displaying the abnormality alarm. In another embodiment, when the abnormality alarm is detected, the SPC system triggers and sends an out-of-control action plan (OCAP) to the alarm manager, and the alarm manager executes the OCAP.

In another embodiment, the equipment manager is used for transmitting an actual measurement value of a sample workpiece measured at a metrology tool, wherein the sample workpiece is selected from one of the workpieces in the cassette, and the VMS calculates a second virtual metrology value of each of the workpieces in the cassette based on the sets of process data and the actual measurement value.

In another embodiment, the scheduler is used for selecting an optimal process route based on the actual measurement value and the second virtual metrology value of each of the workpieces. In another embodiment, the SPC system inspects each of the workpieces according to the second virtual metrology value of each of the workpieces.

According to the aforementioned aspects, a manufacturing system with virtual-metrology capabilities is provided. In one embodiment, the manufacturing system includes a first process tool, a second process tool, a metrology tool, the aforementioned MES, a first R2R controller and a second R2R controller. The first process tool is used for processing a plurality of workpieces in a cassette. The second process tool is used for continuing to process the workpieces after the first process tool has finished processing the workpieces. The metrology tool is used for measuring a sample workpiece selected from the workpieces, thereby obtaining an actual measurement value of the sample workpiece. The first R2R controller is used for performing a W2W feedback control on the first process tool based on the first virtual metrology value of each of the workpieces. The second R2R controller is used for performing a W2W feedforward control on the second process tool based on the second virtual metrology value of each of the workpieces.

Hence, in the embodiments of the present invention, by integrating the VMS system into the MES, the W2W total inspection can be achieved without changing the client's current sampling strategy (i.e. selecting a sample wafer from each cassette); the quality data of all of the products (workpieces) can be obtained in real-time so as to assure product quality and to monitor process tools' health during production in real-time; the periodical (offline) process tool monitoring using the test wafers can be replaced so as to save additional cost of the test wafers and gain more production time of process tools; and the quality data of all of the products can be provided to R2R modules (controllers) for performing W2W process controls more precisely, thus further promoting product quality control and yield.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In general, the subsystems of a MES, such as a SPC system, an alarm manager, a scheduler, etc., all needs to be inputted with actual measurement values of products (workpieces) measured at a metrology tool for performing their respective functions. Embodiments of the present invention are mainly to integrate a VMS system into the MES, thereby using the virtual-metrology values calculated by the VMS system to replace the actual measurement values generated by the metrology tool as the inputs to the respective subsystems of the MES.

The embodiments of the present invention may use any VMS built in is accordance with any algorithm, such as a dual-phase virtual metrology method disclosed in U.S. Pat. No. 7,603,328, and a system and a method for automatic virtual metrology (AVM) disclosed in U.S. Patent Publication No. 2009/0292386, which are hereby incorporated by reference. Hereinafter, the features of these two virtual metrology systems are briefly described, and the details of the method for building the VMS used in the embodiments of the present invention can be referred to these two patent references.

1. U.S. Pat. No. 7,603,328:

This patent reference discloses phase-one and phase-two virtual metrology ($VM_I$ and $VM_{II}$) values, a reliance index (RI) value and a global similarity indexes (GSI) value for each workpiece in a cassette. The RI value is used for evaluating the reliance level of the phase-one and/or phase-two virtual metrology value, and the GSI value is used for assessing the degree of similarity between the set of process data currently inputted into a conjecture model and a model set of process data used for building or training the conjecture model, wherein the GSI value is used to assist the RI value for determining the degree of confidence of the VMS.

In the following, brief description is provided for explaining how to obtain $VM_I$ and $VM_{II}$, RI and GSI values. At first, a plurality of sets of historical process data belonging to a process tool (production equipment) are obtained, wherein each set of process data includes process parameters and their corresponding values; and a plurality of historical measurement values from a metrology tool are obtained, wherein the historical measurement values are the measurement values of the workpieces (such as wafers or glass substrates) which are manufactured in accordance with the sets of historical process data, respectively. Thereafter, a first conjecture model is established by using the sets of historical process data and the historical measurement values, wherein the first conjecture model is built in accordance with a conjecture algorithm, wherein the conjecture algorithm can be such as a multi-regression algorithm, a neural network (NN) algorithm, or any other prediction algorithm. Further, in the dual-phase virtual metrology method disclosed in this patent reference, a first reference model is established by using the aforementioned sets of historical process data and the aforementioned historical measurement values, wherein the first reference model is built in accordance with a reference algorithm, and the reference algorithm is different from the aforementioned conjecture algorithm, and can be such as a multi-regression algorithm, a neural network algorithm, or any other prediction algorithm. Further, in this patent reference, a first statistical distance model is established by using the aforementioned sets of historical process data in accordance with a statistical distance algorithm, wherein the statistical distance algorithm can be such as a Mahalanobis distance algorithm or an Euclidean distance algorithm. Thereafter, the dual-phase virtual metrology method proceeds to waiting for collecting the process data of a plurality of workpieces from the production equipment. After the collection of the process data of a certain workpiece from the process tool is completed, a phase-one conjecture step is promptly performed. In the phase-one conjecture step, the process data of the certain workpiece is inputted into the first conjecture model, thereby computing a phase-one virtual metrology ($VM_I$) value for meeting the requirement of promptness. In the phase-one conjecture step, the process data of the certain workpiece is inputted into the first reference model, thereby computing a first reference prediction value. Then, the overlap area between the statistical distribution of the phase-one virtual metrology value of the certain workpiece and the statistical distribution of the first reference prediction value is calculated, thereby generating the reliance index (RI) value of the phase-one virtual metrology value of the certain workpiece, wherein the reliance index is higher when the overlap area is larger, representing that the reliance level of the phase-one virtual metrology value corresponding thereto is higher. In the phase-one conjecture step, the process data of the certain workpiece obtained from the production equipment is also inputted into the first statistical distance model, thereby computing the global similarity index (GSI) value for the process data corresponding to the phase-one virtual metrology value of the certain workpiece.

Thereafter, one workpiece (a selected workpiece) in each cassette is selected, and sent to a metrology tool (measurement equipment) for measurement. When the actual measurement value of the selected workpiece is obtained from the measurement equipment, a phase-two conjecture step is performed. In the phase-two conjecture step, the process data and actual measurement value of the selected workpiece is added to the aforementioned sets of historical process data and the historical measurement values to retrain the first conjecture model and the first reference model; or the process data and actual measurement value of the selected workpiece is used to tune the first conjecture model and the first reference model, thereby turning the first conjecture model and the first reference model into a second conjecture model and a second reference model. Thereafter, the process data of all the workpieces in the cassette belonging to the selected workpiece is inputted into the second conjecture model and the second reference model, thereby re-computing a phase-two virtual metrology ($VM_{II}$) value and a second reference prediction value of each workpiece in the cassette. Then, the overlap area between the statistical distribution of the phase-two virtual metrology value of each workpiece in the aforementioned cassette and the statistical distribution of the second reference prediction value is calculated, thereby generating the reliance index of the phase-two virtual metrology value of each workpiece in the cassette, wherein the reliance index is higher when the overlap area is larger, representing that the reliance level of the phase-two virtual metrology value corresponding thereto is higher. The phase-two virtual metrology value recalculated herein is more accurate than the phase-one virtual metrology value previously calculated, thus meeting the requirement of accuracy. Meanwhile, the first conjecture model and the first reference model can be updated with the second conjecture model and the second reference model for computing the phase-one virtual metrology value with its accompanying RI and GSI of the workpiece subsequently manufactured by the production equipment.

2. U.S. Patent Publication No. 2009/0292386:

The AVM system disclosed in this patent reference provides the techniques of automatically fanning-out or porting and refreshing a set of VM models to the respective chambers of the same or the same type of equipment, thus greatly reducing the time for implementing virtual metrology thereon and maintaining the desirable accuracy of the virtual metrology. Further, this patent reference provides a process data quality index ($DQI_X$) model for computing a process data quality index ($DQI_X$) value for the process data, wherein the $DQI_X$ model is built in accordance with a principal component analysis (PCA) and an Euclidean distance (ED) algorithm; metrology data quality index ($DQI_y$) model for computing a metrology data quality index ($DQI_y$) value for the actual measurement value (metrology data), wherein the $DQI_y$ model is built in accordance with adaptive resonance theory 2 (ART2) and normalized variability (NV).

Hereinafter, the MES and the manufacturing system with virtual-metrology capabilities of the present invention are explained.

Figure 2:
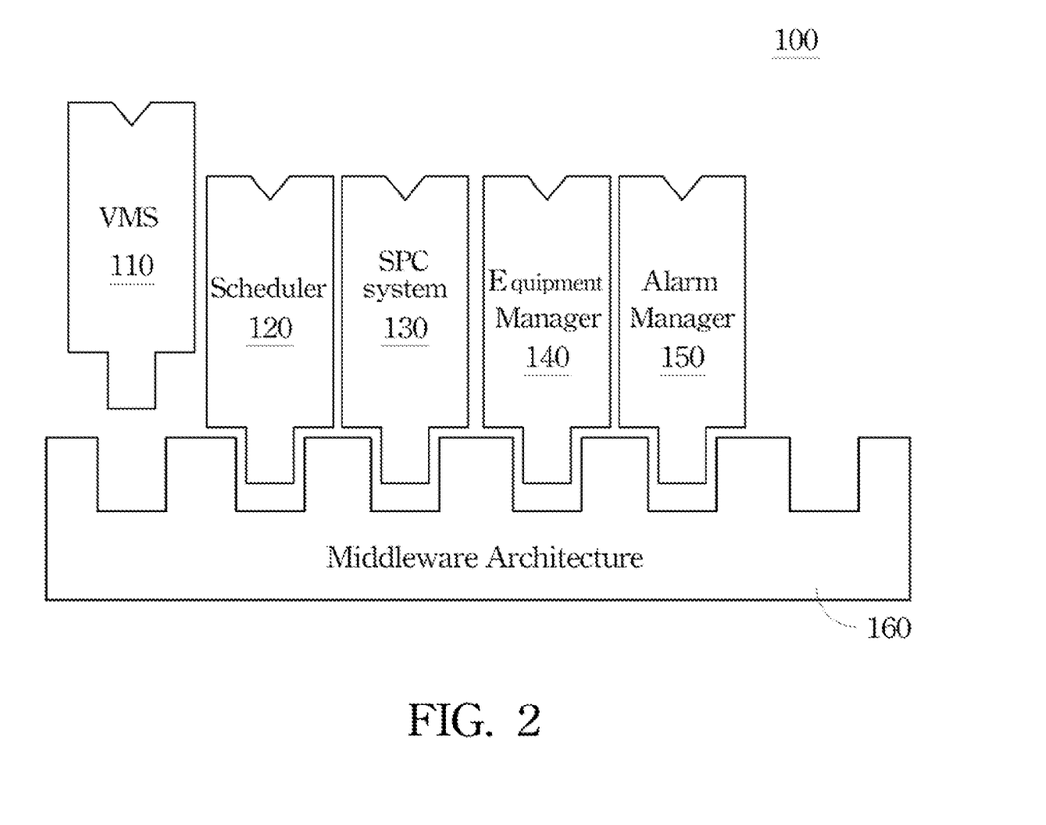
FIG. 2 is a schematic diagram showing the structure of a MES with virtual-metrology capabilities in accordance with one embodiment of the present invention.

Referring to FIG. 2, FIG. 2 is a schematic diagram showing the structure of a MES 100 with virtual-metrology capabilities in accordance with one embodiment of the present invention. In one embodiment, the MES 100 includes a VMS 110, a scheduler 120, a SPC system 130, an equipment manager 140 and an alarm manager 150. These subsystems can be built on a middleware architecture 160, for example. The middleware architecture can be an object request broker architecture, such as Common Object Request Broker Architecture (CORBA) adopted by SEMATECH (SEmiconductor MAnufacturing TECHnology). The equipment manager 140 can be linked to process and metrology tools for achieving shop floor tool management; automatically collecting and retrieving tool warning and error messages; uploading and downloading tool process programs; remote monitoring tool statuses; and linking to other subsystems, etc. The SPC system 130 is mainly to collect and analyze real-time data with respect to critical processes in a factory floor process, and to adopt statistical measures to define various parameters and fabricate control charts, histograms, pareto charts etc. in accordance with quality features, thereby determining the stability and variance of quality. The alarm manager 150 is used for issuing significant abnormalities and managing system historical alarms. The scheduler 120 is used for arranging the sequence of workpieces processed on process tools, thereby assigning important products to stable process tools, thus selecting an optimal process route (golden route). The VMS 110 is used for providing a first virtual metrology value and a second virtual metrology value to the equipment manager 140, the SPC system 130, the alarm manager 150 and the scheduler 120, so that each of those subsystems may obtain a measurement value of each workpiece in production, and perform its function based on those measurement values of the workpieces. It is worthy to be noted that, since being able to obtain the measurement of each workpiece, the SPC system 130 can inspect all of the workpieces, i.e. the so-called total inspection or W2W total inspection.

In one embodiment, the first virtual metrology value is the aforementioned phase-one virtual metrology value ($VM_I$) disclosed by U.S. Pat. No. 7,603,328, and the second virtual metrology value is the aforementioned phase-two virtual metrology value ($VM_{II}$) disclosed by U.S. Pat. No. 7,603,328. In another embodiment, the VMS 110 may provide the RI value of the phase-one virtual metrology value and its corresponding GSI and $DQI_X$ values. In another embodiment, the VMS 110 may provide the RI value of the phase-two virtual metrology value and its corresponding GSI and $DQI_y$ values. These RI, GSI, $DQI_X$, and $DQI_y$ values can assist the SPC system 130 to perform the total inspection. In another embodiment, only one of the first virtual metrology value and the second virtual metrology value is needed, i.e. except those disclosed in U.S. Pat. No. 7,603,328, and U.S. Patent Publication No. 2009/0292386, other virtual metrology methods are also applicable to the present invention for obtaining the virtual metrology value. In another embodiment, the VMS 110 also can provide the $DQI_y$ value of the actual measurement value of the sample workpiece 12, thereby verifying the quality of the actual measurement.

Figure 3:
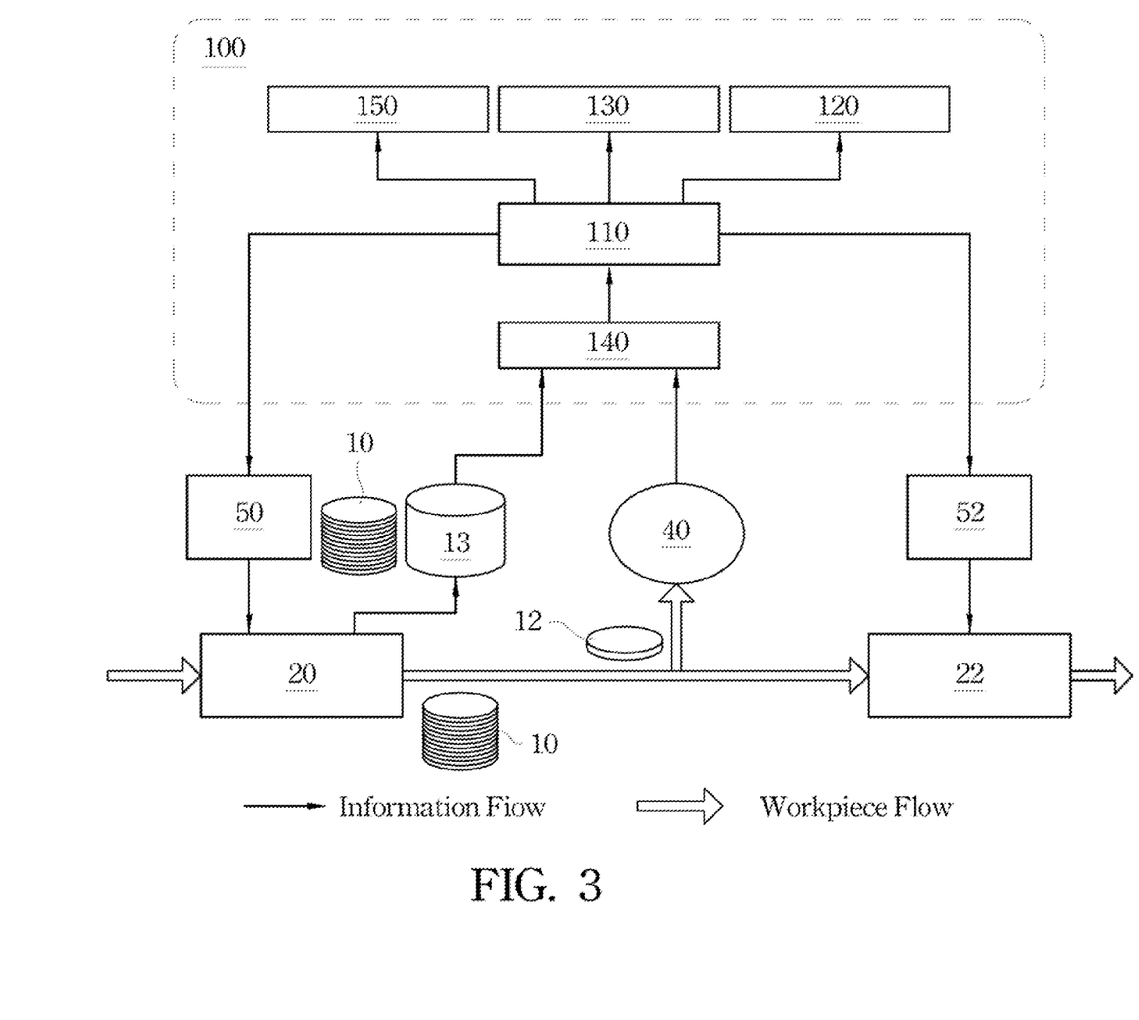
FIG. 3 is a schematic diagram showing the structure and signal flows of a manufacturing system with virtual-metrology capabilities in accordance with one embodiment of the present invention.

Referring to FIG. 3, FIG. 3 is a schematic diagram showing the structure and signal flows of a manufacturing system with virtual-metrology capabilities in accordance with one embodiment of the present invention. The manufacturing system includes a first process tool 20, a second process tool 22, a metrology tool 40, the aforementioned MES 100, a first R2R controller 50 and a second R2R controller 52. The first process tool 20 is used for processing a plurality of workpieces 10 in a cassette (not shown), and sends a plurality of sets of process data 13 used for processing the respective workpieces 10 to the equipment manager 140, and the second process tool 22 is used for continuing to process the workpieces 10 after all of the workpieces 10 have been processed by the first process tool 20. In other words, the first process tool 20 is a tool (such as a deposition tool) performing the current process, and the second process tool 22 is a tool (such as a CMP (Chemical Mechanical Polishing) tool) performing the process subsequent to the current process. The metrology tool 40 is used for measure a sample workpiece 12 selected from the workpieces 10 to obtain an actual measurement value of the sample workpiece 12. The first R2R controller 50 is used for performing feedback control on the first process tool 20 by using the first virtual metrology value (such as $VM_I$) of each workpiece 10. Since the first virtual metrology value ($VM_I$) can be generated promptly by, for example, a dual-phase virtual metrology system used for predicting workpiece thicknesses, it can be used as a feedback input to the first R2R controller 50 of the first process tool 20, thereby meeting the requirement of promptness. The second R2R controller 52 is used for performing feedforward control on the second process tool 22 by using the second virtual metrology value (such as $VM_{II}$) of each workpiece 10. Since the second virtual metrology value ($VM_{II}$) has excellent •accuracy of prediction, it can be used as a feedforward input to the second R2R controller 52.

Figure 4:
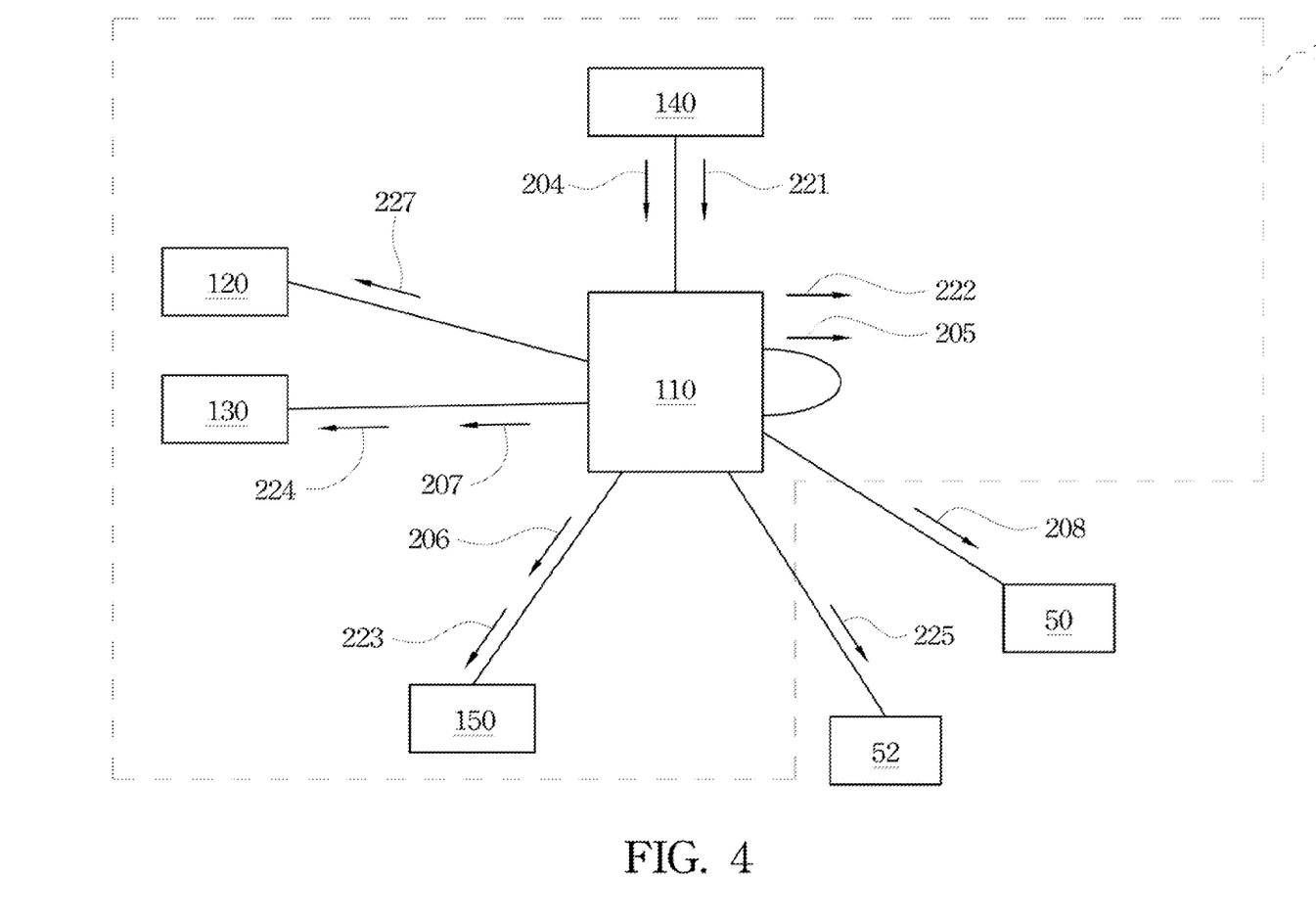
FIG. 4 is a schematic diagram used for explaining the collaboration and method of integrating a VMS into MES of one embodiment of the present invention.

Referring to FIG. 3 and FIG. 4, FIG. 4 is a schematic diagram used for explaining the collaboration and method of integrating a VMS into MES of one embodiment of the present invention. The equipment manager 140 is used for transmitting the sets of process data 13 sent from the first process tool 20 (step 204) and the actual measurement value of the sample workpiece 12 sent from the metrology tool 40 (step 221) to the VMS 110, wherein the sets of process data are used to process the workpieces 10 in the cassette. The VMS 110 is used to calculate the first virtual metrology value (such as $VM_I$) of each workpiece 10 and/or its accompanying RI, GSI and $DQI_X$ values, and to determine if the RI, GSI and $DQI_X$ values have met the requirements of their respective thresholds, thereby detecting if there is at least one abnormality alarm occurring (step 205). The VMS 110 also can utilize the sets of the process data and the actual measurement value of the sample workpiece 12 to calculate the $DQI_y$ value of the actual measurement value. If the $DQI_y$ value of the actual measurement value is within the threshold, its corresponding process data and actual measurement value can be applied to calculate the second virtual metrology values (such as $VM_{II}$) of all the workpieces 10 and/or their accompanying RI and GSI values, and the VMS 110 detects if there is at least one abnormality alarm occurring (step 222) by determining if the RI and GSI values have met the requirements of their respective thresholds.

After step 205, the VMS 110 reports the first virtual metrology values ($VM_I$) and/or their accompanying RI, GSI and $DQI_X$ values to the SPC system 130 for performing total inspection (step 207), and reports the first virtual metrology value (VIA) to the first R2R controller 50 for supporting feedback control (step 208). If an abnormality alarm is detected in step 205, the VMS 110 reports the abnormality alarm to the alarm manager 150 (step 206).

After step 222, the VMS 110 reports the second virtual metrology value ($VM_{II}$) and/or its accompanying RI, GSI and $DQI_y$ values of each workpiece in the cassette and the actual measurement value of the sample workpiece 12 to the scheduler 120 (step 227), thereby selecting an optimal process route for dispatching, i.e. golden route consideration. The VMS 110 reports the second virtual metrology values ($VM_{II}$) of all the workpieces in the cassette and/or their accompanying RI, GSI and $DQI_y$ values and the actual measurement value of the sample workpiece 12 to the SPC system 130 (step 224), and reports the second virtual metrology values ($VM_{II}$) to the second R2R controller 52 for supporting feedward control (step 225). If an abnormality alarm is detected in step 222, the VMS 110 reports the abnormality alarm to the alarm manager 150 (step 223).

Figure 5:
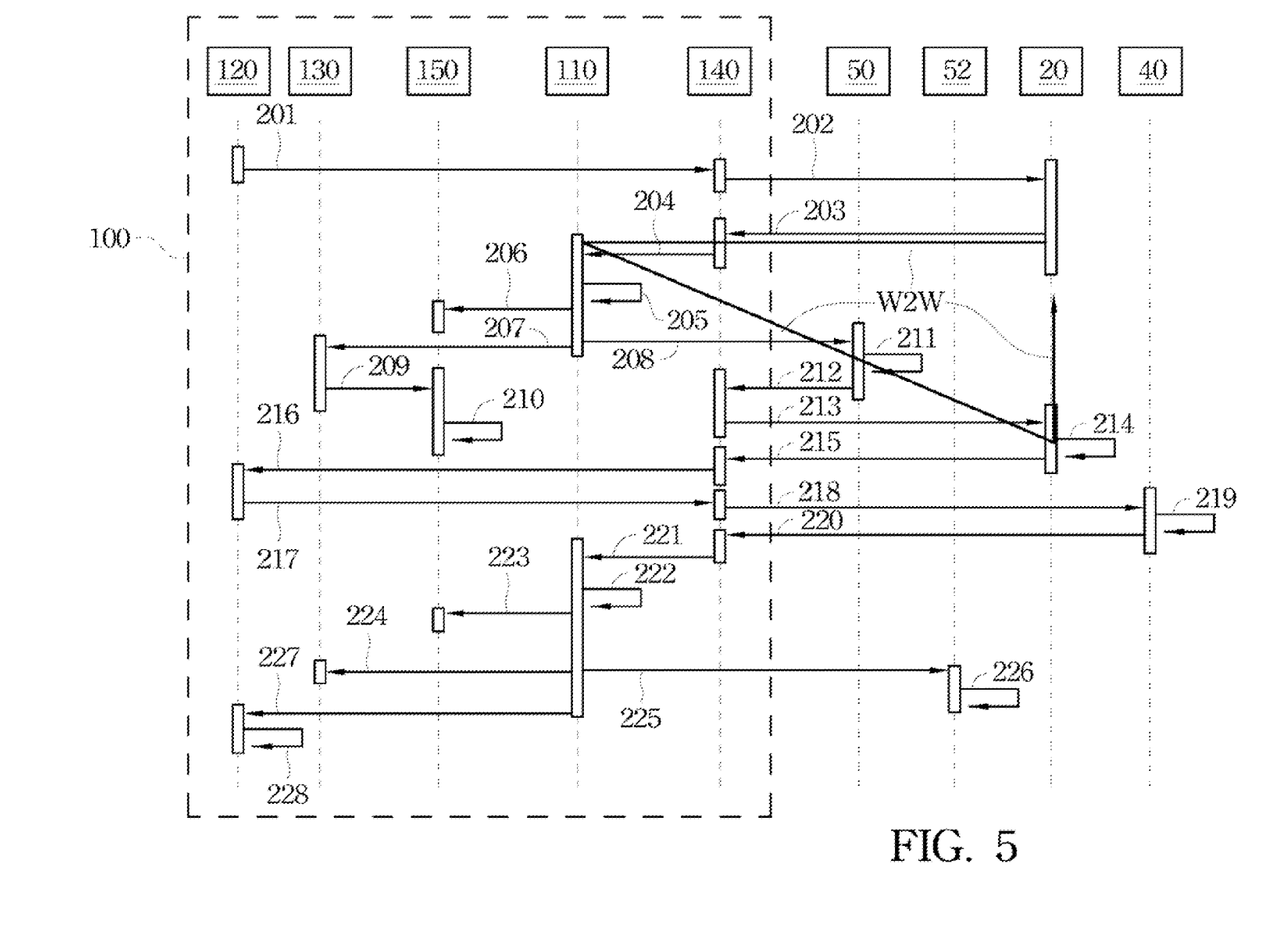
FIG. 5 is a schematic diagram showing operating scenarios among the respective components in the manufacturing system with virtual-metrology capabilities in accordance with one embodiment of the present invention.

Referring to FIG. 5, FIG. 5 is a schematic diagram showing operating scenarios among the respective components in the manufacturing system with virtual-metrology capabilities in accordance with one embodiment of the present invention. At first, the scheduler 120 send an instruction for dispatching a lot to the equipment manager 140 (step 201), wherein the lot can be a plurality of workpieces in a cassette. Thereafter, the equipment manager 140 transfers the instruction to the first process tool 20 (step 202). The first process tool 20 then sends the process data for processing the respective workpieces in the lot to the equipment manager 140 (step 203), and then the equipment manager 140 transfers the process data to the VMS 110 (step 204). The VMS 110 calculates the first virtual metrology values ($VM_I$) and/or their accompanying RI, GSI and $DQI_X$ values, and detects if there is an abnormality alarm occurring (step 205). If the abnormality alarm is detected, the VMS reports the abnormality alarm to the alarm manager 150 (step 206). The VMS 110 reports the first virtual metrology values ($VM_I$) and/or their accompanying RI, GSI and $DQI_X$ values to the SPC system 130 for performing total inspection on workpiece quality, and checking if there is an abnormality alarm occurring (step 207), and the VMS 110 reports the first virtual metrology values ($VM_I$) to the first R2R controller 50 for supporting feedback control (step 208). When an abnormality alarm is detected, the SPC system 130 triggers and sends an out-of-control action plan (OCAP) to the alarm manager 150 (step 209), and then the alarm manager 150 executes the OCAP (step 210).

After receiving the first virtual metrology values ($VM_I$), the first R2R controller 50 calculates control advice (step 211). The R2R controller 50 reports the control advice to the equipment manager 140 (step 212), and then the equipment manager 140 transfers the control advice to the first process tool 20 for performing tool control (step 213). The first process tool 20 determines if all of the workpieces in the cassette have been processed completely (step 214), and if there still are workpieces waiting for processing, step 203 is performed again. If all of the workpieces in the cassette has been processed completely, the first process tool 20 reports a job done message to the equipment manager 140 (step 215), and then the equipment manager 140 transfers the job done message to the scheduler 120 (step 216).

The scheduler 120 issues an instruction for dispatching a sample workpiece to the equipment manager 140 (step 217), wherein the sample workpiece is selected from the lot of step 201. Thereafter, the equipment manager 140 transfers the instruction to the metrology tool 40 (step 218). The metrology tool 40 performed measurement on the sample workpiece (step 219), and delivers an actual measurement value of the sample workpiece to the equipment manager 140 (step 220), and then the equipment manager 140 transfers the actual measurement value to the VMS 110 (step 221). Thereafter, the VMS 110 may update the virtual metrology prediction model, for example, and calculates the second virtual metrology values ($VM_{II}$) of all the workpieces in the cassette and/or their accompanying RI, GSI and $DQI_y$ values, and detects if there is at least one abnormality alarm occurring (step 222). When an abnormality alarm is detected in step 222, the VMS 110 reports the abnormality alarm to the alarm manager 150 (step 223). The VMS 110 reports the second virtual metrology values ($VM_{II}$) of all the workpieces in the cassette and/or their accompanying RI, GSI and $DQI_y$ values and the actual measurement value of the sample workpiece to the SPC system (step 224), and reports the second virtual metrology values ($VM_{II}$) to the second R2R controller 52 for supporting feedforward control (step 225). After receiving the second virtual metrology values ($VM_{II}$), the second R2R controller 52 calculates control advice (step 226). The VMS 110 also reports the second virtual metrology values ($VM_{II}$) of all the workpieces in the cassette and/or their accompanying RI, GSI and $DQI_y$ values and the actual measurement value of the sample workpiece to the scheduler 120 (step 227) for selecting a golden route. Based on the performances of the process tools, the scheduler 120 selects an optimal process tool for dispatching (step 228).

It can be know from the above embodiments that, by integrating the VMS system into the MES, the MES and the manufacturing system can achieve W2W total inspection without changing a client's current sampling strategy (i.e. selecting a sample wafer from each cassette), and obtain the quality data of all of the products (workpieces) in real-time so as to assure product quality and to monitor process tools' health during production in real-time, and replaces the periodical (offline) process tool monitoring using the test wafers so as to save additional cost of the test wafers and gain more production time of process tools, and provide the quality data of all of the products to R2R modules (controllers) for performing process controls more precisely, thus further promoting product quality control and yield.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing execution system (MES) with virtual-metrology capabilities for assisting an enterprise to actively collect and monitor production data generated during fabrication procedures since receiving orders, production in process, process control unit product completion, the MES comprising:

a middleware architecture;

an equipment manager which is built on the middleware architecture and linked to a process tool for transmitting a plurality of sets of process data sent from the process tool and linked to a metrology tool for transmitting an actual measurement value of a sample workpiece measured at the metrology tool, wherein the sets of process data are used for respectively processing a plurality of workpieces in a cassette, and the sample workpiece is selected from one of the workpieces in the cassette, and the equipment manager is used for achieving shop floor tool management, automatically collecting and retrieving tool warning and error messages, uploading and downloading tool process programs, and remote monitoring tool statuses;

a virtual metrology system (VMS) which is built on the middleware architecture for computing a first virtual metrology value of each of the workpieces based on the sets of process data and calculating a second virtual metrology value of each of the workpieces in the cassette based on the sets of process data and the actual measurement value;

a statistical process control (SPC) system which is built on the middleware architecture for inspecting the quality of each of the workpieces according to the first virtual metrology value of each of the workpieces and detecting if there is at least one abnormality alarm occurring;

an alarm manager which is built on the middleware architecture for receiving and displaying the abnormality alarm; and a scheduler which is built on the middleware architecture for issuing an instruction for dispatching the sample workpiece to the equipment manager, and selecting an optimal process route based on the actual measurement value of the sample workpiece and the second virtual metrology value of each of the workpieces; the equipment manager, the VMS, the SPC system, the alarm manager and the scheduler communicating with each other through the middleware architecture.

2. The MES as claimed in claim 1, wherein the SPC system inspects the quality of each of the workpieces according to the second virtual metrology value of each of the workpieces.

3. The MES as claimed in claim 1, wherein when the abnormality alarm is detected, the SPC system triggers and sends an out-of-control action plan (OCAP) to the alarm manager, and the alarm manager executes the OCAP.

4. The MES as claimed in claim 1, wherein the VMS computes the first virtual metrology value with its reliance index (RI) value and global similarity indexes (GSI) value and process data quality index ($DQI_x$) value of each of the workpieces based on the sets of process data, and the SPC system detects if there is at least one abnormality alarm occurring which is determined by the VMS according to the RI value, the GSI value and the $DQI_x$ value of the first virtual metrology value of each of the workpieces.

5. The MES as claimed in claim 1, wherein the VMS computes the second virtual metrology value with its reliance index (RI) value and global similarity indexes (GSI) value and metrology data quality index ($DQI_y$) value of each of the workpieces based on the sets of process data and the actual measurement value of the sample workpiece and reports the second virtual metrology value of each of the workpieces and its accompanying RI, GSI and $DQI_y$ value and the actual measurement value of the sample workpiece to the scheduler for selecting the optimal process route.

6. A manufacturing system with virtual-metrology capabilities, comprising:

a first process tool for processing a plurality of workpieces in a cassette;

a second process tool for continuing to process the workpieces after the first process tool has finished processing the workpieces;

a metrology tool for measuring a sample workpiece selected from the workpieces, thereby obtaining an actual measurement value of the sample workpiece;

a manufacturing execution system (MES) for assisting an enterprise to actively collect and monitor production data generated during fabrication procedures since receiving orders, production in process, process control until production completion, the MES comprising:

a middleware architecture;

an equipment manager which is built on the middleware architecture and linked to a process tool for transmitting a plurality of sets of process data sent from the process tool and linked to a metrology tool for transmitting an actual measurement value of a sample workpiece measured at the metrology tool, wherein the sets of process data are used for respectively processing a plurality of workpieces in a cassette, and the sample workpiece is selected from one of the workpieces in the cassette, and the equipment manager is used for achieving shop floor tool management, automatically collecting and retrieving tool warning and error messages, uploading and downloading tool process programs, and remote monitoring tool statuses;

a virtual metrology system (VMS) which is built on the middleware architecture for computing a first virtual metrology value of each of the workpieces based on the sets of process data and calculating a second virtual metrology value of each of the workpieces in the cassette based on the sets of process data and the actual measurement value;

a statistical process control (SPC) system which is built on the middleware architecture for inspecting the quality of each of the workpieces according to the first virtual metrology value of each of the workpieces and detecting if there is at least one abnormality alarm occurring;

a scheduler which is built on the middleware architecture for issuing an instruction for dispatching the sample workpiece to the equipment manager, and selecting an optimal process route based on the actual measurement value of the sample workpiece and the second virtual metrology value of each of the workpieces; the equipment manager, the VMS, the SPC system, and the scheduler communicating with each other through the middleware architecture;

a first run-to-run (R2R) controller for performing a feedback control on the first process tool by using the first virtual metrology value of each of the workpieces; and a second R2R controller for performing a feedforward control on the second process tool by using the second virtual metrology value of each of the workpiece.

7. The manufacturing system as claimed in claim 6, wherein the MES further comprises:

an alarm manager which is built on the middleware architecture and linked to the VMS for receiving and displaying the abnormality alarm.

8. The manufacturing system as claimed in claim 7, wherein when the abnormality alarm is detected, the SPC system triggers and sends an OCAP to the alarm manager, and the alarm manager executes the OCAP.

9. The manufacturing system as claimed in claim 7, wherein the SPC system inspects the quality of each of the workpieces according to the second virtual metrology value of each of the workpieces.

10. The manufacturing system as claimed in claim 6, wherein the VMS computes the first virtual metrology value with its reliance index (RI) value and global similarity indexes (GSI) value and process data quality index ($DQI_x$) value of each of the workpieces based on the sets of process data, and the SPC system detects if there is at least one abnormality alarm occurring which is determined by the VMS according to the RI value, the GSI value and the $DQI_x$ value of the first virtual metrology value of each of the workpieces.

11. The MES as claimed in claim 6, wherein the VMS computes the second virtual metrology value with its reliance index (RI) value and global similarity indexes (GSI) value and metrology data quality index ($DQI_y$) value of each of the workpieces based on the sets of process data and the actual measurement value of the sample workpiece and reports the second virtual metrology value of each of the workpieces and its accompanying RI, GSI and $DQI_y$ value and the actual measurement value of the sample workpiece to the scheduler for selecting the optimal process route.

12. A manufacturing execution system (MES) with virtual-metrology capabilities for assisting an enterprise to actively collect and monitor production data generated during fabrication procedures since receiving orders, production in process, process control unit product completion, the MES comprising:

a middleware architecture;

an equipment manager which is built on the middleware architecture and linked to a process tool for transmitting a plurality of sets of process data sent from the process tool, wherein the sets of process data are used for respectively processing a plurality of workpieces in a cassette, and the equipment manager is used for achieving shop floor tool management; automatically collecting and retrieving tool warning and error messages; uploading and downloading tool process programs; and remote monitoring tool statuses;

a virtual metrology system (VMS) which is built on the middleware architecture for computing a first virtual metrology value of each of the workpieces based on the sets of process data;

a statistical process control (SPC) system which is built on the middleware architecture for inspecting the quality of each of the workpieces according to the first virtual metrology value of each of the workpieces and detecting if there is at least one abnormality alarm occurring; and an alarm manager which is built on the middleware architecture for receiving and displaying the abnormality alarm; the equipment manager, the VMS, the SPC system, and the alarm manager communicating with each other through the middleware architecture.

13. The MES as claimed in claim 12, wherein the equipment manager is linked to a metrology tool for transmitting an actual measurement value of a sample workpiece measured at the metrology tool, wherein the sample workpiece is selected from one of the workpieces in the cassette, and the VMS calculates a second virtual metrology value of each of the workpieces in the cassette based on the sets of process data and the actual measurement value.

14. The MES as claimed in claim 13, further comprising:

a scheduler which is built on the middleware architecture for selecting an optimal process route based on the actual measurement value and the second virtual metrology value of each of the workpieces.

15. The MES as claimed in claim 13, wherein the SPC system inspects the quality of each of the workpieces according to the second virtual metrology value of each of the workpieces.

16. The MES as claimed in claim 12, wherein when the abnormality alarm is detected, the SPC system triggers and sends an out-of-control action plan (OCAP) to the alarm manager, and the alarm manager executes the OCAP.

17. The MES as claimed in claim 12, wherein the VMS computes the second virtual metrology value with its reliance index (RI) value and global similarity indexes (GSI) value and metrology data quality index ($DQI_y$) value of each of the workpieces based on the sets of process data and the actual measurement value of the sample workpiece and reports the second virtual metrology value of each of the workpieces and its accompanying RI, GSI and $DQI_y$ value and the actual measurement value of the sample workpiece to the scheduler for selecting the optimal process route.

* * * * *